United States Patent Office 3,752,838
Patented Aug. 14, 1973

3,752,838
METHYLCARBAMOYLOXY-
THIOLCARBANILATES
Mathias H. J. Weiden, Raleigh, N.C., and Linwood K. Payne, Jr., deceased, late of Charleston, W. Va., by Betty Lou B. Payne, executrix, Charleston, W. Va., assignors to Union Carbide Corporation, New York, N.Y.
No Drawing. Continuation-in-part of application Ser. No. 817,152, Apr. 17, 1969, which is a continuation-in-part of application Ser. No. 521,410, Jan. 18, 1966. This application July 15, 1970, Ser. No. 55,244
Int. Cl. C07c 155/08
U.S. Cl. 260—455 A                    8 Claims

ABSTRACT OF THE DISCLOSURE

A new series of methylcarbamoyloxy-thiolcarbanilates have been found to be exceptionally active insecticides, particularly against larval stages of lepidopterous pests. These compounds are effective insecticides.

This application is a continuation-in-part of U.S. Ser. No. 817,152, filed Apr. 17, 1969, now abandoned, which was a continuation-in-part of U.S. Ser. No. 521,410, filed Jan. 18, 1966, which has since matured into U.S. Pat. 3,450,745, issued June 17, 1969.

This invention relates to new chemical compounds useful as pesticides, particularly as insecticides and as nematocides for the protection of crops.

Of the large number of commercial synthetic insecticides available today, relatively few exhibit systemic activity, that is, the ability to be absorbed by the vascular system of the plant to be protected and to be translocated to the parts of the plant attacked by insects. Once ingested by the insect, the systemic insecticide acts as a strong stomach poison and thus provides efficient insect control.

A major advantage inherent in the mode of action of a systemic insecticide and not shared by contact poisons is that beneficial insects which do not feed on the protected plants are not harmed by application of the systemic toxicant. In addition, systemic materials are generally not subject to loss of activity caused by weathering, e.g., heavy rain and strong sunlight, and, consequently, relatively few applications of the insecticide are required for long lasting insect control.

Many of the compounds of this invention possess the major attributes of a systemic insecticide, viz. good systemic properties and high stomach toxicity. Our materials are also relatively stable in distinction to other carbamate insecticides. In addition to having broad-spectrum activity against a wide variety of adult insects, the present materials provide outstanding control of their larval stages, particularly of lepidopterous pests.

The compounds of this invention are (Methylcarbamoyloxy)thiolcarbanilates which can be depicted structurally as follows:

(I) 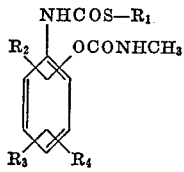

wherein $R_1$ represents lower alkyl, lower alkenyl, cycloalkyl, lower phenylalkyl, phenyl or naphthyl groups which can be substituted with halogen, nitro, lower alkyl, lower alkoxy, lower alkylthio, and the like; $R_2$, $R_3$ and $R_4$ individually are hydrogen, or lower alkyl and $R_2$ and $R_3$ may optionally be linked together to form an alkylene or alkenylene chain containing from preferably 3 to 5 carbon atoms.

We have found that, while all the compounds defined by general Formula I above, have activity as insecticides, compounds in which $R_1$ is lower alkyl, especially methyl, are preferred because of exceptional activity. If $R_1$ is an aromatic or aralkyl group, it should usually contain less than about 10 carbon atoms.

In addition, we have found that the total number of carbon atoms in $R_2$, $R_3$ and $R_4$ should not exceed about 7, the most preferred are compounds in which $R_4$ is hydrogen and the total number of carbon atoms in $R_2$ and $R_3$ is less than about 5.

As typical of the compounds embraced by Formula I there can be mentioned the following:

S-methyl 2,6-dimethyl-4-(methylcarbamoyloxy) thiolcarbanilate,
S-methyl 2,5-dimethyl-4-(methylcarbamoyloxy) thiolcarbanilate,
S-methyl 2,3-dimethyl-4-(methylcarbamoyloxy) thiolcarbanilate,
S-methyl 2-methyl-5-chloro-4-(methylcarbamoyloxy) thiolcarbanilate,
S-methyl 2-methyl-5-isopropyl-4-(methylcarbamoyloxy) thiolcarbanilate,
S-methyl 2-trimethylethyl-6-methyl-4-(methylcarbamoyloxy)thiolcarbanilate,
S-n-butyl 2-methyl-4-(methylcarbamoyloxy) thiolcarbanilate,
S-benzyl 2,6-dimethyl-4-(methylcarbamoyloxy) thiolcarbanilate,
S-phenylpropyl 3-methyl-4-(methylcarbamoyloxy) thiolcarbanilate,
S-phenyl 2,6-dimethyl-4-(methylcarbamoyloxy) thiolcarbanilate,
S-1-naphthyl 3-methyl-4-(methylcarbamoyloxy) thiolcarbanilate,
S-(4-methylphenyl) 2,6-dimethyl-4-(methylcarbamoyloxy)thiolcarbanilate,
S-(4-chlorophenyl) 2,6-dimethyl-4-(methylcarbamoyloxy)thiolcarbanilate,
S-(1- or 2-naphthyl) 2,6-dimethyl-4-(methylcarbamoyloxy)thiolcarbanilate,
S-allyl 2,6-dimethyl-4-(methylcarbamoyloxy) thiolcarbanilate,
S-methyl 2-isopropyl-4-(methylcarbamoyloxy) thiolcarbanilate,
S-benzyl 2-isopropyl-4-(methylcarbamoyloxy) thiolcarbanilate,
S-(4-chlorobenzyl) 2-methyl-4-(methylcarbamoyl) thiolcarbanilate,
S-phenyl 2-isopropyl-4-(methylcarbamoyloxy) thiolcarbanilate,
S-(4-methylphenyl) 2-isopropyl-4-(methylcarbamoyloxy) thiolcarbanilate,
S-(3-methylphenyl) 2-methyl-4-(methylcarbamoyl) thiolcarbanilate,
S-(4-chlorophenyl) 2-isopropyl-4-(methylcarbamoyloxy) thiolcarbanilate,
S-(1- or 2-naphthyl) 2-isopropyl-4-(methylcarbamoyloxy) thiolcarbanilate,
S-allyl 2-isopropyl-4-(methylcarbamoyloxy)thiolcarbanilate,
S-methyl-2,3-tetramethylene-4-(methylcarbamoyloxy) thiolcarbanilate,
S-methyl 4-methylcarbamoyloxy thiolformamido naphthalene,
S-methyl 2,3-pentamethylene-4-(methylcarbamoyloxy) thiolcarbanilate,
S-methyl 2,3-tetramethylene-5-methyl-4-(methylcarbamoyloxy)thiolcarbanilate, S-methylthioethyl 3-methyl-4-(methylcarbamoyloxy) thiolcarbanilate,
S-methoxyethyl 3-methyl-4-(methylcarbamoyloxy) thiolcarbanilate,
S-(4-methoxyphenyl) 3-methyl-4-(methylcarbamoyloxy) thiolcarbanilate,
S-cyclohexyl 3-methyl-4-(methylcarbamoyloxy) thiolcarbanilate,
S-cyclopentyl 3-methyl-4-(methylcarbamoyloxy) thiolcarbanilate,
S-methyl-3-(p-nitrophenyl)-4-(methylcarbamoyloxy) thiolcarbanilate,
and the like.

The compounds of our invention can be synthesized from the corresponding 4-hydroxythiolcarbanilate compounds according to the following reaction:

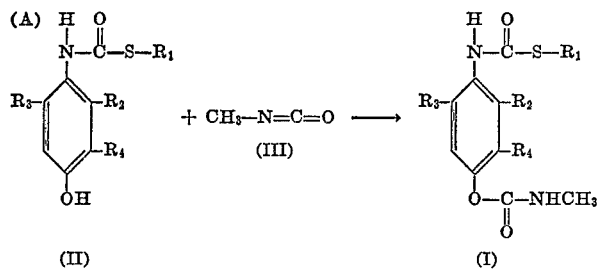

wherein $R_1$, $R_2$, $R_3$ and $R_4$ are defined as above. Methods for synthesizing 4-hydroxythiolcarbanilate compounds have been described previously in publications reviewed by Matzner et al., Chem. Rev. 64, No. 6, 633 (1964). The corresponding aminophenols are readily prepared by the method of J. R. Stevens and R. H. Beutel, J. Am. Chem. Soc. 63, 308 (1941).

The 4-hydroxythiolcarbanilate compounds (II) are themselves prepared from the corresponding aminophenol compounds by reaction with the appropriate chloroformate (V):

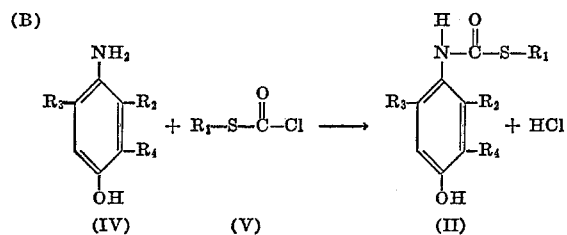

The corresponding 3-aminophenol starting materials can be prepared conveniently by the general method described by I. V. Aleksandrov and Y. S. Abrabushkin, J. Gen. Chem. (U.S.S.R.) 30, 3374 (1960). The 2-aminophenols are prepared by the general method described by A. Proskouriakoff and R. V. Tetherington, J. Am. Chem. Soc. 52, 3978 (1930). The ortho and meta isomers of our invention are prepared by reacting the appropriate 2- and 3-aminophenol starting materials in accordance with reaction (A) described above.

Reaction (A), is effected by dissolving one equivalent of the hydroxythiolcarbanilate compound (II) in a suitable solvent, such as acetone, and reacting the solution with at least one equivalent of methyl isocyanate, in the presence of an effective amount of a suitable catalyst, such as a lower tertiary alkyl amine or an organotin salt. The reaction can be carried out at temperatures of from about 10° C. to 125° C., preferably between 30° C. and 80° C. The molar excess of methyl isocyanate can be up to 10:1 but no advantage is gained by using ratios of more than 1.2:1. The amount of catalyst typically required is from about 0.1 to about 2 percent by weight based on starting carbanilate (II). The reaction is conveniently carried out at atmospheric pressure, but pressures from 1 to 10 atmospheres can be employed. The reaction is usually complete after about two hours to a day, depending on the reaction temperature used. The reaction product is recovered in conventional ways, e.g., by removing the volatile components of the reaction mixture in vacuo and purifying the residue by recrystallization.

The following examples are illustrative:

EXAMPLE I

S-methyl 2,6-dimethyl-4-(methylcarbamoyloxy) thiolcarbanilate (A) 4-amino-3,5-xylenol.—Five moles (956 grams) of sulfanilic acid and 2.5 moles (265 grams) of anhydrous sodium carbonate were dissolved in 5 liters of water. This solution was cooled to 15° C. and sodium nitrite (370 grams; 5.4 moles) dissolved in one liter of water was added. To a stirred reactor was charged 4.5 kilograms of crushed ice and 1060 grams of concentrated hydrochloric acid. The solution of the sulfanilic acid was then slowly added to the hydrochloric acid keeping the reaction temperature at about 15° C. The mixture was stirred for twenty-five minutes after the addition was completed and the temperature was maintained at 10 to 15° C. The resulting slurry of diazotized sulfanilic acid was transferred to two Erlenmeyer flasks and the reactor charged with 3,5-xylenol (610 grams; 5 moles) dissolved in aqueous sodium hydroxide (1100 grams; 27.5 moles in 4500 grams of water). After cooling the xylenol solution to 5° C., the diazotized sulfanilic acid slurry was added with stirring over a period of one hour. The reaction temperature was maintained at 4–8° C. during the addition. After the addition was complete, the reaction mixture was stirred at this temperature for an additional ninety minutes. The resulting dark red solution was heated to 50° C. and 230 grams of sodium hydrosulfite added slowly. The solution was stirred for ten minutes and then, while heating, 2070 grams of sodium hydrosulfite was added over a fifteen minute period. The solution was finally heated to 80° C. and after twenty-five minutes at this temperature the red color faded rapidly and the tan solid amine precipitated. At this time the reaction temperature rose to 90° C. and subsided without external cooling. The mixture was stirred at 80–90° C. for twenty minutes, cooled to room temperature and the solid collected by filtration and dried.

The 4-amino-3,5-xylenol weighed 685 grams (100 percent yield) and melted at 175–180° C.

(B) S-methyl 4-hydroxy-2,6 - dimethylthiocarbanilate (8 grams; 0.038 mole), obtained by the reaction of 4-amino-3,5-xylenol with methyl thiolchloroformate, was dissolved in 100 milliliters of anhydrous acetone and treated with 3 grams of methyl isocyanate and 2 drops of triethylamine. After two days at room temperature, a precipitate had formed which was collected by filtration and washed thoroughly with cold acetone to afford 5 grams of the product having a melting point 204–206° C.

EXAMPLE II

S-phenyl 2-methyl-4-(methylcarbamoyloxy) thiolcarbanilate

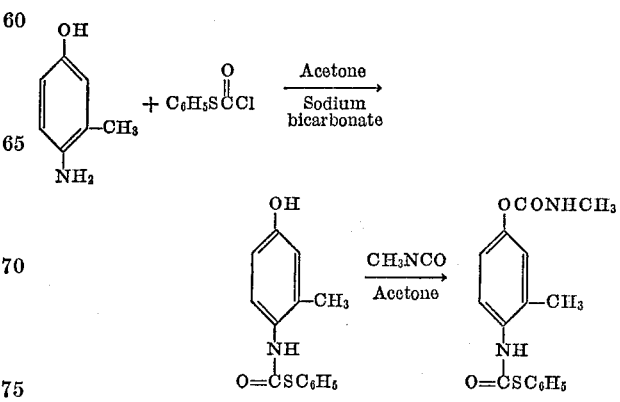

(A) S-phenyl 2-methyl-4-hydroxythiolcarbanilate.—To a suspension of 6.1 grams (0.05 mole) of 4-amino-3-methylphenol and 5 grams (0.055 mole) of sodium bicarbonate in 75 milliliters of acetone was added, dropwise with stirring and cooling, 9 grams (0.055 mole) of phenylthiolchloroformate over a period of 15 minutes. After stirring at room temperature for four hours the reaction mixture was filtered and the filtrate concentrated in vacuo to give a residue which crystallized. This residue was crystallized from 1:1 ethyl acetate/isopropyl ether mixture to give 9.5 grams of (A), melting point 135–136° C., whose infrared spectrum was consistent with the proposed structure.

(B) S-phenyl 2-methyl-4-(methylcarbamoyloxy)thiolcarbanilate.—To a soltuion of the product from the preceeding reaction (9.5 grams, 0.0326 mole) in 75 milliliters of acetone was added 5.7 grams (excess) of methylisocyanate and one drop of dibutyltin diacetate. The mixture was allowed to stand in a sealed pressure bottle overnight and was then poured into 125 milliliters of ice water with stirring. The solid which formed was collected by filtration and after air drying, was recrystallized from ethyl acetate/hexane mixture to give the product.

The other thiolcarbanilates were prepared in a similar manner. Structures were supported by infrared and nuclear magnetic resonance spectroscopy.

The following compounds, illustrative of those encompassed by this invention, were tested with regard to their pesticidal activity.

| Compound: | Structure | Name |
|---|---|---|
| 1 | OCONHCH$_3$ / CH$_3$—〇—CH$_3$ / NHCOSC$_6$H$_5$ | S-phenyl 2,6-dimethyl-4-(methylcarbamoyloxy)thiolcarbanilate. Melting point: 205–206° C. |
| 2 | OCONHCH$_3$ / CH$_3$—〇—CH$_3$ / NHCOSCH$_3$ | S-methyl 2,6-dimethyl-4-(methylcarbamoyloxy)thiolcarbanilate. Melting point: 204–206° C. |
| 3 | OCONHCH$_3$ / CH$_3$—〇—CH$_3$ / NHCOSC$_6$H$_4$CH$_3$(p) | S-(4-tolyl) 2,6-dimethyl-4-(methylcarbamoyloxy)thiolcarbanilate. Melting point: 212–214° C. *Analysis.*—Calc'd (percent): C, 62.8; H, 5.85; O, 13. . Found (percent): C, 62.6; H, 6.00; O, 14.2. |
| 4 | OCONHCH$_3$ / CH$_3$—〇—CH$_3$ / NHCOSC$_6$H$_4$Cl(p) | S-(4-chlorophenyl) 2,6-dimethyl-4-(methylcarbamoyloxy)thiolcarbanilate. Melting point: 207–209° C. *Analysis.*—Calc'd (percent): C, 56.0; H, 4.7; O, 13.2. Found (percent): C, 56.0; H, 4.8; O, 13.5. |
| 5 | OCONHCH$_3$ / 〇—CH(CH$_3$)$_2$ / NH / O=CSC$_6$H$_5$ | S-phenyl 2-isopropyl-4-(methylcarbamoyloxy)thiolcarbanilate. Melting point: 137–139° C. *Analysis.*—Calc'd (percent): C, 62.78; H, 5.85. Found (percent): C, 62.67; H, 6.02. |
| 6 | OCONHCH$_3$ / 〇—CH$_3$ / NH / O=CSC$_6$H$_5$ | S-phenyl 2-methyl-4-(methylcarbamoyloxy)thiolcarbanilate. Melting point: 201–203° C. *Analysis.*—Calc'd (percent): C, 60.75; H, 5.10. Found (percent): C, 60.50; H, 5.01. |
| 7 | OCONHCH$_3$ / CH$_3$—〇 / NHCOS—CH$_2$—〇—Cl | S-(4-chlorobenzyl)-2-methyl-4-(methylcarbamoyloxy)thiolcarbanilate. Melting point: 162–163° C. *Analysis.*—Calc'd (percent): C, 55.97; H, 4.68; O, 7.68. Found (percent): C, 55.78; H, 4.56; O, 7.67. |

TABLE—Continued

| Compound: | | |
|---|---|---|
| 8 | 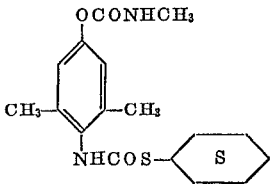 | S-(cyclohexyl) 2,6-dimethyl-4-(methylcarbamoyloxy)thiolcarbanilate. Melting point: 192–196° C. *Analysis.*—Calc'd (percent): C, 60.88; H, 6.91; O, 8.35. Found (percent): C, 60.92; H, 7.15; O, 8.39. |
| 9 | 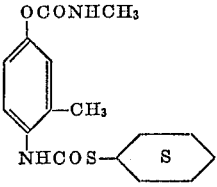 | S-(cyclohexyl) 2-methyl-4-(methylcarbamoyloxy)thiolcarbanilate. Melting point: 188–189° C. *Analysis.*—Calc'd (percent): C, 59.80; H, 6.59; O, 8.72. Found (percent): C, 59.51; H, 6.75; O, 8.50. |
| 10 | 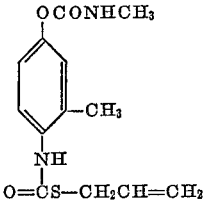 | S-(2-propenyl) 2-methyl-4-(methylcarbamoyloxy)thiolcarbanilate. Melting point: 145–147° C. *Analysis.*—Calc'd (percent): C, 55.71; H, 5.75; O, 10.00. Found (percent): C, 55.49; H, 5.67; O, 9.95. |
| 11 | 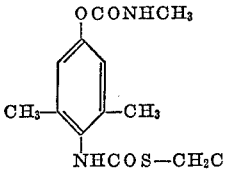 | S-(2-propenyl) 2,6-dimethyl-4-(methylcarbamoyloxy)thiolcarbanilate. Melting point: 164–166° C. *Analysis.*—Calc'd (percent): C, 57.13; H, 6.17; O, 9.52. Found: (percent) C, 56.81; H, 6.00; O, 9.46. |
| 12 | 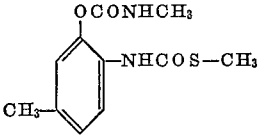 | S-methyl 2-(methylcarbamoyloxy)-4-methylthiolcarbanilate. Melting point: 147–150° C. *Analysis.*—Calc'd (percent): C, 52.0; H, 5.55; O, 11.2. Found (percent): C, 52.48; H, 5.59; O, 10.75. |
| 13 | 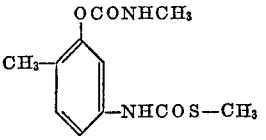 | S-methyl 3-(methylcarbamoyloxy)-4-methylthiolcarbanilate. Melting point: 164–167° C. *Analysis.*—Calc'd (percent): C, 51.96; H, 5.55; O, 11.02. Found (percent): C, 51.89; H, 5.36; O, 10.42. |
| 14 | 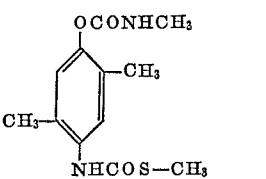 | S-methyl 4-(methylcarbamoyloxy)-3,6-dimethylthiolcarbanilate. Melting point: 182–186° C. *Analysis.*—Calc'd (percent): C, 53.72; H, 6.01; O, 10.44. Found (percent): C, 53.23; H, 5.96; O, 10.28. |
| 15 | 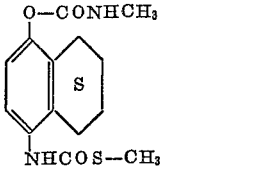 | S-methyl 4-(methylcarbamoyloxy)-2,3-tetramethylene thiolcarbanilate. Melting point: 167–169° C. *Analysis.*—Calc'd (percent): C, 57.13; H, 6.17; O, 9.52. Found (percent): C, 56.89; H, 6.11; O, 9.65. |

The compounds were evaluated with respect to their contact and systemic activity against respective insects, vis, aphid, armyworm, Mexican bean beetle, and housefly, by the following standard procedures.

Suspensions of the test compounds were prepared by dissolving one gram of compound in 50 milliliters of acetone in which had been dissolved in 0.1 gram (10 percent of the weight of compound) of an alkylphenoxy polyethoxyethanol surfactant, as an emulsifying or dispersing agent. The resulting solution was mixed into 150 milliliters of water to give roughly 200 milliliters of a suspension containing the compound in finely divided form. The thus-prepared stock suspension contained 0.5 percent by weight of compound. The test concentrations employed in the tests described hereinbelow was obtained by diluting the stock suspension with water. Serial dilution tests were carried out in the indicated instances to determine the $LD_{50}$ (concentration of chemical required to kill fifty percent of the insect population) values for each test compound. The test procedures were as follows:

Bean aphid foliage spray test.—Adults and nymphal stages of the bean aphid (*Aphis fabae* Scop.), reared on potted dwarf nasturtium plants at 65–70° F. and 50–70 percent relative humidity, constituted the test insects. For testing purposes, the number of aphids per pot was standardized to 100–150 by trimming plants containing excess aphids. The test compounds were formulated by diluting the stock suspension with water to give a suspension containing 100 parts of test compound per million parts of final formulation, by weight. The potted plants (one pot per compound tested), infested with 100–150 aphids, were placed on a revolving turntable and sprayed with 100–110 milliliters of test compound formulation by use of a De Vilbiss spray gun set at 40 p.s.i.g. air pressure. This application, which lasted 30 seconds, was sufficient to wet the plants to run-off. As a control, 100–110 milliliters of a water-acetone-emulsifier solution containing no test compound were also sprayed on infested plants. After spraying, the pots were placed on their sides on a sheet of white standard mimeograph paper which had been previously ruled to facilitate counting. Temperature and humidity in the test room during the 24-hour holding period were 65–70° F. and 50–70 percent, respectively. Aphids which fell onto the paper and were unable to remain standing after being uprighted were considered dead. Aphids remaining on the plants were observed closely for movement and those which were unable to move the length of the body upon stimulation by prodding were considered dead. Percent mortality was recorded for various concentration levels.

Southern armyworm leaf dip test.—Larvae of the southern armyworm (*Prodenia eridania* (Cram.)), reared on Tendergreen bean plants at a temperature of 80±5° F. and a relative humidity of 50±5 percent, constituted the test insects. The test compounds were formulated by diluting the stock suspension with water to give a suspension containing 500 parts of test compound per million parts of final formulation (by weight). Paired seed leaves, excised from Tendergreen bean plants, were dipped in the test formulations until thoroughly wetted, excess liquid being removed by gentle shaking. While the leaves were drying in a ventilated hood, wilting was prevented by placing the stems in water. When dry, the paired leaves were separated and each one was placed in a 9-centimeter Petri dish lined with moistened filter paper. Five randomly selected larvae were introduced into each dish and the dishes were closed. The closed dishes were labeled and held at 80–85° F. for three days. Although the larvae could easily consume the whole leaf within twenty-four hours, no more food was added. Larvae which were unable to move the length of the body, even upon stimulation by prodding, were considered dead. Percent mortality was recorded for various concentration levels.

Mexican bean beetle leaf dip test.—Third instar larvae of the Mexican bean beetle (*Epilachna varivestis*, Muls.), reared on Tendergreen bean plants at a temperature of 80±5° F. and 50±5 percent relative humidity, were the test insects. The test compounds were formulated by diluting the stock suspension with water to give a suspension containing 100 parts of test compound per million parts of final formulation by weight. Paired seed leaves excised from Tendergreen bean plants were dipped in the test formulation until thoroughly wetted, excess liquid being removed by gentle shaking. While the leaves were drying under a hood, wilting was prevented by placing the stems in water. When dry, the paired leaves were separated and each was placed in a 9-centimeter Petri dish lined with moistened filter paper. Four randomly selected larvae were introduced into each dish, and the dishes were closed. The closed dishes were labeled and held at a temperature of 80±5° F. for three days. Although the larvae could easily consume the leaf within 24 to 48 hours, no more food was added. Larvae which were unable to move the length of the body, even upon stimulation, were considered dead. Percent mortality was recorded for various concentration levels.

Fly bait test.—Four to six day old adult house flies (*Musca domestica*, L.), reared according to the specifications of the Chemical Specialties Manufacturing Association (Blue Book, McNair-Dorland Co., N.Y. 1954; pages 243–244, 261) under controlled conditions of 80±5° F. and 50±5 percent relative humidity, were the test insects. The flies were immobilized by anesthetizing with carbon dioxide and twenty-five immobilized individuals, males and females, were transferred to a cage consisting of a standard food strainer about five inches in diameter which was inverted over blotting paper. The test compounds were formulated by diluting the stock suspension with a 10 percent (by weight) sugar solution to give a suspension containing 500 parts of test compound per million parts of final formulation, by weight. Ten milliliters of the test formulation were added to a soufflé cup containing a one-inch square of an absorbent pad. This bait cup was introduced and centered on the blotting paper under the food strainer prior to admitting the flies. The caged flies were allowed to feed on the bait for twenty-four hours, at a temperature of 80±5° F. and the relative humidity of 50±5 percent. Flies which showed no sign of movement on prodding were considered dead. Percent mortality was recorded for various concentration levels.

The results are set forth in Table I below:

TABLE I.—BIOLOGICAL PROPERTIES

| | Insecticidal activity, $LD_{50}$ p.p.p.[a] | | | |
|---|---|---|---|---|
| Compound No. | Bean aphid | Army-worm | Mexican bean beetle | Housefly |
| 1 | 2 | 60 | 75 | 450 |
| 2 | — | 30 | 65 | 10 |
| 3 | 20 | ~125 | — | — |
| 4 | 5 | ~60 | — | — |
| 5 | 10 | 24 | 25 | — |
| 6 | — | 25 | 40 | — |
| 7 | — | 17 | — | — |
| 8 | — | 12 | — | — |
| 9 | — | 32 | >100 | — |
| 10 | — | 30 | >100 | 90 |
| 11 | — | <30 | 25 | 500 |
| 12 | — | — | — | 120 |
| 13 | — | — | — | 325 |
| 14 | — | 260 | 10 | 40 |
| 15 | — | ~500 | 12 | 1,000 |

[a] Dashes indicate absence of significant activity.

Generally, compounds in which $R_1$ is methyl are preferred because of their exceptional activity in a relatively simple molecule; however, the size of $R_1$ appears not to be a limiting factor inasmuch as relatively large substituents such as substituted phenyl or benzyl yield compounds of high activity. Compounds in which the total number of carbon atoms in the ring substituents ($R_2$, $R_3$ and $R_4$) does not exceed 4 are generally more active and, therefore, preferred. Compounds in which there is a single isopropyl substituent group on the carbon atom adjacent to the carbanilate function, or in which the two carbon atoms adjacent this function are both substituted with methyl are surpassingly active and hence most preferred.

It will be understood that the insect species employed in the above tests are merely representative of a wide variety of pests that can be controlled by use of our compounds. For example, the hornworm, cabbage worm, corn ear worm, and Colorado potato beetle can also be combated with our compounds.

In addition to their insecticidal activity, noteworthy nematocidal activity was also displayed by our compounds.

The compounds contemplated in this invention may be applied as insecticides and nematocides according to methods known to those skilled in the art. Pesticidal compositions containing the compounds as the active toxicant will usually comprise a carrier and/or diluent, either liquor or solid.

Suitable liquid diluents or carriers include water, petroleum distillates, or other liquid carriers with or without surface active agents. Liquid concentrates may be prepared by dissolving one of these compounds with a non-phytotoxic solvent such as acetone, xylene, or nitrobenzene and dispersing the toxicants in water with the acid of suitable surface active emulsifying and dispersing agents.

The choice of dispersing and emulsifying agents and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fuller's earth, and the like. In the formulation of the wettable powders the aforementioned dispersing agents as well as lignosulfonates can be included.

The required amount of the toxicants contemplated herein may be applied per acre treated in from 1 to 200 gallons or more of liquid carrier and/or diluent or in from about 5 to 500 pounds of inert solid carrier and/or diluent. The concentration in the liquid concentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre.

The pesticides contemplated herein prevent attack by insects and nematocides upon plants or other material to which the pesticides are applied, and they have high residual toxicity. With respect to plants they have a high margin of safety in what when used in sufficient amount to kill or repel the insects, they do not burn or injure the plant, and they resist weathering which includes wash-off caused by rain, decomposition by ultra-violet light, oxidation, or hydrolysis in the presence of moisture or, at least, such decomposition, oxidation, and hydrolysis as would materially decrease the desirable insecticidal characteristic of the toxicants or impart undesirable characteristics, for instance, phytotoxicity, to the toxicants. The toxicants are so chemically inert that they are now compatible with substantially any other constitutents of the spray schedule, and they may be used in the soil, upon the seeds, or the roots of plants without injuring either the seeds or roots of plants, yet by root uptake they will kill the pests feeding thereon.

What is claimed is:

1. Methylcarbamoyloxy-thiocarbanilates of the formula:

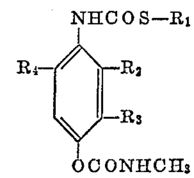

wherein $R_1$ represents lower alkyl, lower alkenyl, cycloalkyl, lower phenylalkyl, phenyl or naphthyl which can be substituted with halogen, lower alkyl, lower alkoxy and lower alkylthio groups; $R_2$, $R_3$ and $R_4$ individually are hydrogen or lower alkyl and $R_2$ and $R_3$ taken together may represent an alkylene chain containing from 3 to 5 carbon atoms, with the proviso that $R_2$, $R_3$ and $R_4$ may not all be hydrogen.

2. Compound as claimed in claim 1 wherein the total number of carbon atoms in $R_2$, $R_3$ and $R_4$ does not exceed 7.

3. A compound as claimed in claim 1 wherein said methylcarbamoyloxy-thiolcarbanilate is S-phenyl 2,6-dimethyl-4-(methylcarbamoyloxy)thiolcarbanilate.

4. A compound as claimed in claim 1 wherein said methylcarbamoyloxy-thiolcarbanilate is S-methyl 2,6-dimethyl-4-(methylcarbamoyloxy)thiolcarbanilate.

5. A compound as claimed in claim 1 wherein said methylcarbamoyloxy-thiolcarbanilate is S-(4-tolyl) 2,6-dimethyl-4-(methylcarbamoyloxy)thiolcarbanilate.

6. A compound as claimed in claim 1 wherein said methylcarbamoyloxy-thiolcarbanilate is S-(4-chlorophenyl)-2,6-dimethyl - 4 - (methylcarbamoyloxy)thiolcarbanilate.

7. A compound as claimed in claim 1 wherein said methylcarbamoyloxy-thiolcarbanilate is S-phenyl 2-isopropyl 4-(methylcarbamoyloxy)thiolcarbanilate.

8. A compound as claimed in claim 1 wherein said methylcarbamoyloxy-thiolcarbanilate is S-phenyl 2-methyl-4-(methylcarbamoyloxy)thiolcarbanilate.

References Cited

UNITED STATES PATENTS

| | | | |
|---|---|---|---|
| 3,404,975 | 10/1968 | Wilson et al. | 260—455 A |
| 3,513,240 | 5/1970 | Bernardus et al. | 424—300 |
| 3,356,713 | 12/1967 | Richter | 424—300 |
| 3,323,989 | 6/1967 | Payne, Jr. | 424—300 |
| 3,197,364 | 7/1965 | Kilsheimer et al. | 424—300 |
| 3,329,702 | 7/1967 | Rohr | 424—300 |

ELBERT L. ROBERTS, Primary Examiner

G. HOLLRAH, Assistant Examiner

U.S. Cl. X.R.

424—300; 260—141, 575